United States Patent [19]
Kahn

[11] 4,213,380
[45] Jul. 22, 1980

[54] COOKING MACHINE

[76] Inventor: Arthur R. Kahn, 1218 Drexel Ave., Apt. 39, Miami Beach, Fla. 33139

[21] Appl. No.: 49,145

[22] Filed: Jun. 18, 1979

[51] Int. Cl.³ .............................................. A47J 37/00
[52] U.S. Cl. ........................................ 99/349; 17/32; 99/353; 99/386; 99/395; 99/443 C; 198/403
[58] Field of Search ............. 99/443 C, 386, 395, 99/396, 397, 352, 353, 349, 393, 396, 409, 423, 424; 17/32; 198/403

[56] References Cited

U.S. PATENT DOCUMENTS

| | | | |
|---|---|---|---|
| 1,881,126 | 10/1932 | Parr | 99/423 |
| 2,286,013 | 6/1942 | Roth | 99/409 |
| 2,529,253 | 11/1950 | Hoffman | 99/386 |
| 3,450,027 | 6/1969 | Lohr | 99/423 |
| 3,457,853 | 7/1969 | Morley | 99/423 |
| 3,721,178 | 3/1973 | Szabrak | 99/386 |
| 3,948,385 | 4/1976 | Shinomiya | 198/403 |

FOREIGN PATENT DOCUMENTS

| | | | |
|---|---|---|---|
| 1429824 | 2/1969 | Fed. Rep. of Germany | 99/395 |
| 1119118 | 6/1956 | France | 99/353 |

*Primary Examiner*—Billy J. Wilhite

[57] ABSTRACT

A cooking machine for making hamburgers which includes a pair of aligned ovens and a conveyor adapted to travel separate spaced hamburger patties over the top of the oven, a dispenser is provided at one end of the conveyor run and intermediate the run, a mechanism is provided for rotating the hamburgers through 180° for cooking on both sides, the first cooking operation being over one oven and the second cooking operation being over the second oven; and a compressing assembly is provided to size the hamburgers in its run over the second conveyor portion.

3 Claims, 8 Drawing Figures

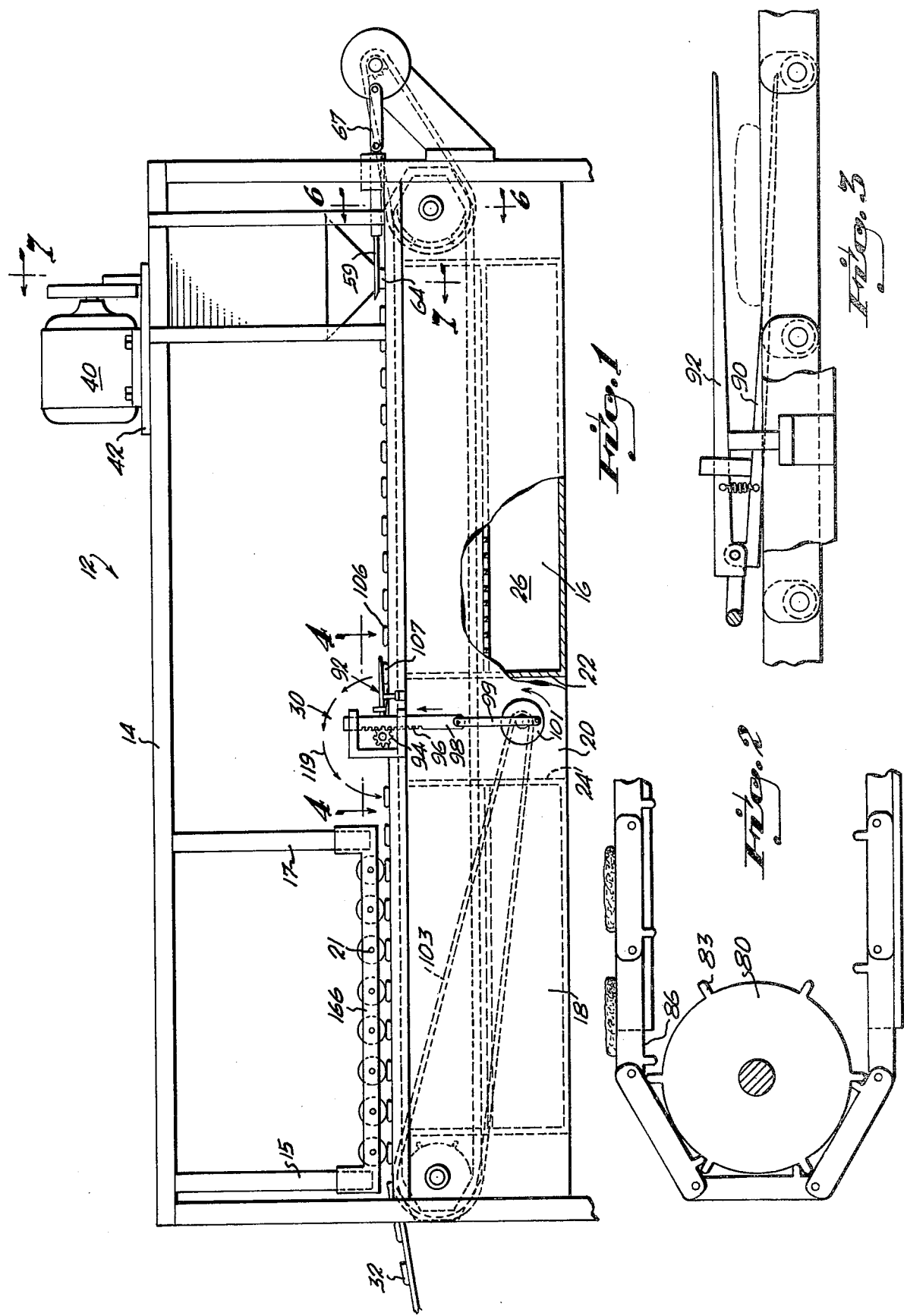

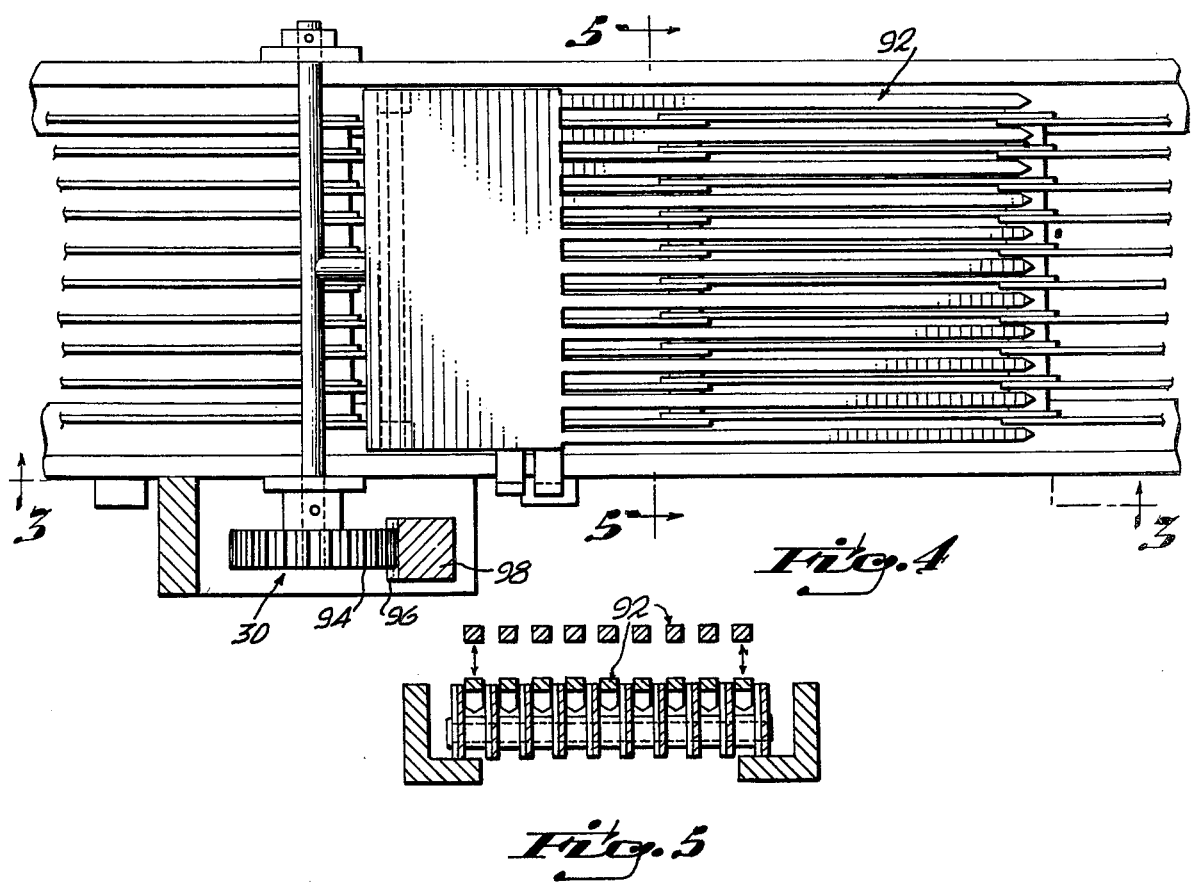
Fig. 4
Fig. 5
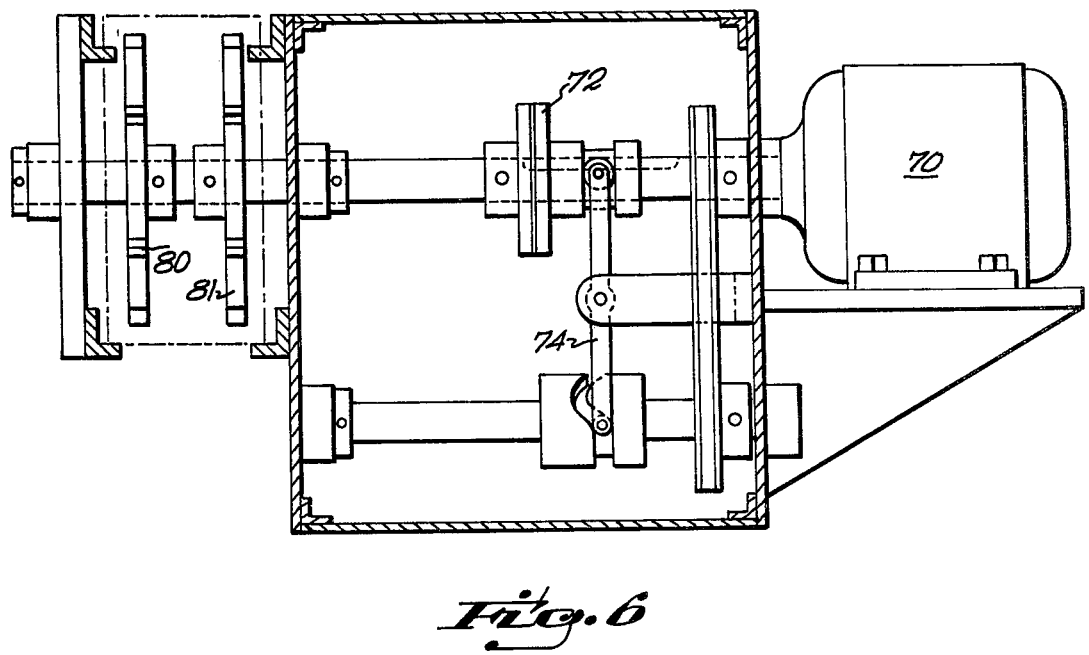
Fig. 6

4,213,380

1

COOKING MACHINE

FIELD OF THE INVENTION

This invention relates to cooking devices.

BACKGROUND OF THE INVENTION

As is quite well known, in the fast food business it is desirable to cook a large number of hamburgers in a continuous operation. This invention is of such a device.

More specifically, this invention provides a pair of aligned ovens which may be charcoal fired and over which a conveyor is adapted to run continuously from a dispensing mechanism at one end to an exit ramp at the other end and wherein there is provided, intermediate the run, and between the two ovens, a device for rotating the hamburgers through 180°.

In accordance with these and other objects which will become apparent hereinafter, the instant invention will now be described with reference to the accompanying drawings, in which:

DESCRIPTION OF THE DRAWINGS

FIG. 1 is a side elevation view which has been partly broken away to illustrate the invention;

FIG. 2 is a partial view of the left-hand side of FIG. 1;

FIG. 3 is a view in cross section taken on the plane indicated by the arrowed line 3—3 of FIG. 4;

FIG. 4 is a top plan view of that portion of FIG. 1 designated by the numerals 4—4;

FIG. 5 is a view in cross section taken on the plane indicated by the line 5—5 of FIG. 4 and looking in the direction of the arrows;

FIG. 6 is an end view of the right-hand side of FIG. 1;

DESCRIPTION OF THE PREFERRED EMBODIMENT

Figure 7:
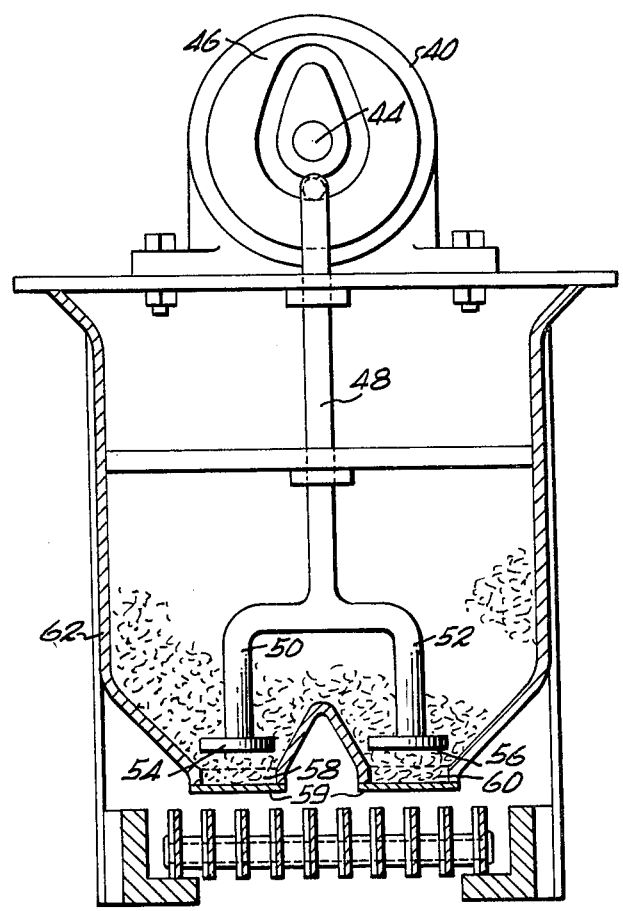
FIG. 7 is a view in cross section taken on the plane indicated by the line 7—7 of FIG. 1 and looking in the direction of the arrows.

Referring to the drawings wherein like reference characters designate like or corresponding parts throughout the several views and referring particularly to FIG. 1, there is shown a hamburger making device generally designated by the numeral 12 which includes a frame, the upper portion of which is designated by the numeral 14 and wherein a first and a second aligned oven 16 and 18 are provided there being a space 20 between the end faces 22 and 24 of the oven 16 and 18 respectively. The lower portion of the oven is adapted to receive charcoal in the chamber, such as that designated by the numeral 26. The device is adapted to move hamburgers dispensed in the form of patties on the right hand side of FIG. 1 onto a track across the top of the oven to a central zone wherein a mechanism 30 is provided which turns the hamburgers over for passage over the second oven 18 to be dispensed as cooked meat patties as indicated by the numeral 32.

Figure 8:
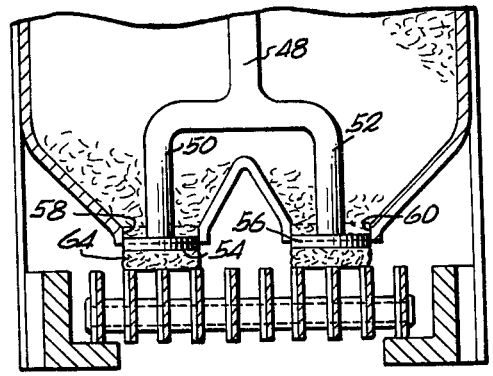
FIG. 8 is a partial view of the lower portion of FIG. 7 and illustrating the operation of the dispensing of the hamburger pattie.

Referring now to the dispensing operation of the apparatus, it is seen that there is a motor generally designated by the numeral 40 which is fastened to the upper member 14 by means of a mounting plate 42. The drive shaft 44 of the motor is provided with a cam 46 which is operatively connected to a plunger arm 48, see FIG. 7, which is bifurcated defining a first and a second spaced lower leg 50 and 52, each of which terminates at a head 54 and 56. These heads are sized for passage in close adjacent relation to the mouth 58 and 60 of the lower zone of the dispenser vessel 62. As the motor operates, cyclically, there is movement of the plunger arm upwardly and downwardly so that with each revolution, a pair of patties are dispensed as indicated at 64 in FIG. 8. The patties are dispensed onto a moving grille or conveyor which is driven by a motor which is seen in FIG. 6 and designated by the numeral 70, the same being to the rear of the right-hand side of FIG. 1. The motor 70 is provided with a clutch means 72 and an operator 74 to engage and disengage the clutch. When the clutch is engaged, sprockets, such as that designated by the numeral 80 and 81 engage the grille or conveyor as seen in FIG. 2, with the sprocket projections 83 engaging the underside of the conveyor as at 86. It is thus seen that the conveyor moves from one end to the other end to travel the hamburger patties on this moving grille above the ovens 16 and 18.

The mechanism 30 in the center zone, that is between the two ovens, will now be described. It is a mechanism for turning the hamburgers over. Reference will now be made to the FIGS. 3 and 4. It is seen that a spatula in the form of a pair of outwardly diverging leg portions 90 and 92 are provided, the same being connected through a gear 94 to a rack 96 on a rod 98 which is connected through a link 99 to be rotated by the eccentric 101, which in turn is driven through a chain 103 from the driven conveyor, C FIGS. 1 and 2. In operation, a patty, such as that designated by the numeral 106 will move into the position shown in 107 and, as seen in FIG. 3, this patty is then captivated between the two legs 90 and 92 and, thereafter it is rotated in the direction of the arrowed line 119 to the other side of the conveyor. As it travels over the second oven 18, the patties are compressed by a bank of aligned rollers supported on a member 166 which is horizontal or parallel to the run of the conveyor. This structure is supported on the upper member 14 by a pair of legs 15 and 17 which extend downwardly, the rollers being journaled on suitable axles such as that designated by the numeral 21.

The legs 15 and 17 may be adjustable vertically to raise and lower the bank of rollers for suitable size hamburgers.

In the preferred embodiment, the rollers of the bank 166 are preferably coated by Nylon. Additionally, the dispenser means is provided with a knife 59 which is adapted to be moved into slicing relation of the meat patties after they have been dispensed and the plunger heads have moved upwardly, the knife being operated by a link 67 which is connected to the knife and is adapted to cyclically move the knife in cooperation with the dispensing operation.

What is claimed is:

1. A mass cooking device for cooking meat patties and the like comprising:
    a power driven conveyor belt means having a first dispensing end and a second exiting end and a middle zone defining a patty turnover zone, the conveyor means includes a conveyor belt endlessly rotating between the ends and defining a continuous loop, the belt includes elongated members spaced apart forming a grill thereby when the belt rotates it comprises a moving grill, a pair of aligned ovens being a first and second oven, the first oven adjacent the dispenser end of the conveyor means, the second oven adjacent the exiting end of the conveyor means, both ovens adjacent the middle zone, means for dispensing meat patties on the belt at the dispensing end of conveyor means, a turnover means spaced between the ovens at the middle zone of the conveyor means comprising:

a V-shaped spatula having a pair of diverging legs, an upper and a lower leg, each leg comprising finger-like structures, the finger-like structures mating compatibly with the moving grill conveyor belt, the lower leg being normally below the belt, gear means coordinated with the conveyor means and the dispensing means for rotating the patty 180° after being captured by the spatula, thereby the patties having been cooked on one side are reversed onto the other side for cooking by the second oven, compressor means fixedly connected to the conveyor means above and aligned with the second oven for squeezing the meat patties tight against the belt, thereby the patties are compressed to attractive and easy to serve packages.

2. The device as set forth in claim 1 wherein said dispenser means comprises a plunger and a vessel having a pair of openings in the lower end, said vessel being adapted to receive a charge of hamburger and means cyclically operating said plunger to force predetermined sized meat patties through the openings.

3. The device as set forth in claim 2 which includes knife means for use in separating patties from the dispenser means.

* * * * *